(12) United States Patent
Smith et al.

(10) Patent No.: US 6,918,820 B2
(45) Date of Patent: Jul. 19, 2005

(54) POLISHING COMPOSITIONS COMPRISING POLYMERIC CORES HAVING INORGANIC SURFACE PARTICLES AND METHOD OF USE

(75) Inventors: Dennis E. Smith, Rochester, NY (US); Suryadevara V. Babu, Pottsdam, NY (US)

(73) Assignee: Eastman Kodak Company, Rochester, NY (US)

( * ) Notice: Subject to any disclaimer, the term of this patent is extended or adjusted under 35 U.S.C. 154(b) by 12 days.

(21) Appl. No.: 10/411,735

(22) Filed: Apr. 11, 2003

(65) Prior Publication Data

US 2004/0203324 A1 Oct. 14, 2004

(51) Int. Cl.[7] .................................................. B24B 1/00
(52) U.S. Cl. .......................................... 451/41; 451/60
(58) Field of Search .............................. 451/41, 28, 60; 438/692, 693; 51/307, 308

(56) References Cited

U.S. PATENT DOCUMENTS

| | | | |
|---|---|---|---|
| 5,736,064 A | * | 4/1998 | Edamura et al. .............. 252/74 |
| 6,136,891 A | * | 10/2000 | Chopin et al. ............... 523/204 |
| 6,454,819 B1 | | 9/2002 | Yano et al. |
| 6,491,843 B1 | | 12/2002 | Srinivasan et al. |
| 6,541,114 B2 | * | 4/2003 | Katou et al. ................. 428/403 |
| 2002/0006728 A1 | | 1/2002 | Matsui et al. |
| 2002/0061651 A1 | * | 5/2002 | Tani et al. ................... 438/689 |
| 2002/0173243 A1 | | 11/2002 | Costas et al. |

FOREIGN PATENT DOCUMENTS

| | | |
|---|---|---|
| EP | 0967269 | 12/1999 |
| EP | 1036836 | 9/2000 |
| EP | 1138734 | 10/2000 |
| EP | 1 243 611 A1 | 11/2000 |
| EP | 1104778 | 6/2001 |

* cited by examiner

*Primary Examiner*—Dung Van Nguyen
(74) *Attorney, Agent, or Firm*—Chris P. Konkol

(57) ABSTRACT

This invention relates generally to compositions and methods for removing adherent materials and polishing surfaces. In one embodiment, the method employs an improved media comprising core-shell particles. The media can be applied to microelectronic objects of manufacture.

32 Claims, No Drawings

POLISHING COMPOSITIONS COMPRISING POLYMERIC CORES HAVING INORGANIC SURFACE PARTICLES AND METHOD OF USE

FIELD OF THE INVENTION

This invention relates generally to compositions and methods for chemical-mechanical polishing. In particular, the invention relates to chemical-mechanical polishing using core-shell polymeric particles, preferably made by limited coalescence. The method involves removing material from a surface by means of rubbing it with particulate media consisting of particles having a core-shell structure in which a polymeric core is embedded with a shell of inorganic particles.

BACKGROUND OF THE INVENTION

Chemical-mechanical polishing ("CMP") is a technology which has its roots in the pre-industrial era. In recent years, CMP has become the technology of choice among semiconductor chip fabricators to planarize the surface of semiconductor chips as circuit pattern layers are laid down. CMP technology is well known, and is typically accomplished using a polishing pad and a slurry or composition which contains chemical reagents and abrasive particles. The chemical reagents function to chemically react with the surface of the layer being polished whereas the abrasive particles perform a mechanical grinding function.

The fabrication of semiconductor wafers typically involves the formation of a plurality of integrated circuits on a semiconductor substrate of, for example, silicon or gallium arsenide. The integrated circuits are generally formed by means of a series of process steps in which patterned layers of materials, such as conductive, insulating and semiconducting materials, are formed on the substrate. In order to maximize the density of integrated circuits per wafer, it is necessary to have an extremely planar precision polished substrate at various stages throughout the semiconductor wafer production process. As such, semiconductor wafer production typically involves at least one, and more typically a plurality of polishing steps, which involve the use of one or more polishing compositions.

The polishing steps typically involve rotating or rubbing the polishing pad and/or semiconductor wafer substrate against each other in the presence of a polishing fluid or composition, usually using a controlled and repetitive motion. The polishing fluid is often mildly alkaline and may optionally contain abrasive particulate materials, e.g., silica. The pad acts to mechanically polish the semiconductor substrate, while the polishing fluid serves to chemically polish the substrate and to facilitate the removal and transport of abraded material off of and away from the rough surface of the article. Typically, a polishing fluid is interposed between the rough surface of the article that is to be polished and the work surface of the polishing pad. The polishing fluid may optionally contain an abrasive material, e.g., particulate cerium oxide.

Chemical-mechanical polishing is commonly used for the polishing of integrated circuits, wherein the chemical agents modify low-lying surfaces and protect them from abrasion and the mechanical agents remove the material to be removed. Polishing can be used to remove either metals or dielectrics in the electronics industry, as well as other materials.

In the case of the removal of a dielectrics or oxides, most conventional CMP slurries used for polishing oxides typically comprise abrasive particles dispersed in an aqueous alkaline medium (i.e., high pH). In some cases, it is desirable to selective polish silicon dioxide compared to silicone nitride. A few CMP slurries are known which do provide a fairly high silicon dioxide to silicon nitride removal rate selectivity. See for example, Srinivasan et al. U.S. Pat. No. 6,491,843, Hosali et al., U.S. Pat. No. 5,738,800; Grover et al., U.S. Pat. No. 5,759,917; Kodama et al, EP 0 786 504 A2; Ronay, EP 0 846 740 A1; and Morrison et al., and EP 0 853 335 A2.

U.S. Patent Publication 2002/0173243 discloses a polishing composition useful for removing excess metal, typically peaks of copper from a semiconductor substrate comprising a wafer and multiple layers of material, including a layer of insulating material, that is deposited and provided with troughs and a metal conductor that is deposited as a layer and is in the troughs to form a copper circuit. The composition comprises organic polymer particles as abrasive particles. Copper is cleared from the surface of the substrate or wafer, with minimized, i.e., substantial reduction in, dishing of the copper circuit. Planarization in this publication refers to clearing the copper layer from the semiconductor substrate with minimized dishing of the copper in the troughs. Planarized refers to a flat polished surface of the semiconductor substrate, and the copper in the troughs having minimized dishing, resulting from a process of CMP that has removed the copper layer.

U.S. Pat. No. 6,454,819 to Yano et al (JSR corporation) discloses a CMP slurry wherein a silicon compound section or metal compound section is provided in the polymer particles to give the surface thereof adequate strength and hardness, excellent heat resistance and suitable flexibility and to increase the polishing rate while also preventing scratches, and by providing a process for manufacture of semiconductor devices using the CMP slurry. The CMP slurry is useful for chemical mechanical polishing in the manufacture of semiconductor devices, and especially chemical mechanical polishing of wafer surfaces. The polymer particles have at least one siloxane-bond-containing section and a metal compound section on the particles. The metal compound can be alumina, ceria, or zirconia.

U.S. Pat. No. 2002/0006728 A1 to Matsui et al. disclose a slurry for CMP comprising a liquid and a plurality of polishing particles, wherein the polishing particle contains an organic particle and a plurality of inorganic particles unified by thermocompression bonding. Preferably, the inorganic particles are manganese dioxide and/or ceria.

EP 1243611 to Nisimoto et al. discloses an aqueous dispersion for chemical mechanical polishing comprising composite particles formed by changing the zeta potential of polymer particles and inorganic particles so they are opposite in sign. The inorganic particles include alumina, titania, and ceria.

PROBLEM TO BE SOLVED BY THE INVENTION

It would be desirable to be able to polish a surface more effectively. It would also be desirable to be able to more finely control or tailor the abrasive properties of the media to balance its ability to remove a particular coating without attacking a particular surface material. It would be desirable to be able to economically manufacture and customize such particles for a particular application. It is an object of the invention to remove surface materials without harming the underlying surface of the structure and which is more effective than other known media.

SUMMARY OF THE INVENTION

The above objects are achieved by providing a composition or abrasive media that comprises core-shell particles for chemical-mechanical polishing. In particular, the invention relates to chemical-mechanical polishing employing an improved media comprising composite particles having polymeric core surrounded by a layer of embedded inorganic particles.

The invention can be used for polishing electronic materials, magnetic materials, optical materials, and the like. Materials removed include metals, oxides, and polymers. In one embodiment this invention can be used for removing metal and/or dielectrics from surfaces of a semiconductor device such as integrated circuits or intermediates in their manufacture or larger components containing them. Thus, "semiconductor device" is used in a wide sense to include polished wafers, various devices (including apparatus) provided with or bearing such wafers, plates manufactured from such wafers, and various devices (including apparatus) provided with such plates (i.e., devices on which such plates are mounted).

In one embodiment, the process of mechanical-chemical polishing for removing material from a surface comprises applying a particulate media against said surface by means of a pad, characterized by the particulate media comprising particles having a core-shell structure in which a polymeric core is adherently covered with a shell of inorganic particles. The composite particles are made by forming liquid droplets with inorganic particles on the surface thereof, followed by solidification of the liquid droplets to form solid particles in which the inorganic particles are embedded. By embedded is meant that the inorganic particles such as silica penetrates the smooth surface of the polymer core. Chemical bonding or electrical charging, as compared to merely physically embedding the particles, is thus not required to hold the inorganic particles in place, although they may be present.

In particular, the method employs an improved media comprising core-shell particles and provides superior surface smoothness. Surface Smoothness is highly desirable in the manufacture of integrated circuits and other manufactured objects.

DETAILED DESCRIPTION OF THE INVENTION

A polishing composition according to the present invention comprises particles having a core-shell structure in which a polymeric core is adherently covered with a shell of inorganic particles, wherein the particles were made by forming liquid droplets with inorganic particles on the surface thereof, followed by solidification of the liquid droplets to form solid particles in which the inorganic particles are embedded. Optionally, said composition can further comprise an oxidizing agent, complexing agent, inhibitor and dishing reducing agent, and/or other polishing agents, aids, or components known in polishing compositions. In particular, preferred polishing agents include glycine and peroxides such as hydrogen peroxide.

In its broadest aspect, the abrasive media of the present invention comprises a polymeric core surrounded by a shell of inorganic particulate. The polymeric core can be any naturally occurring or synthetic polymer such as, for example, olefin homopolymers and copolymers, such as polyethylene, polypropylene, polyisobutylene, polyisopentylene and the like; polyfluoroolefins such as polytetrafluoroethylene, polyvinylidene fluoride and the like, polyamides, such as, polyhexamethylene adipamide, polyhexamethylene sebacamide and polycaprolactam and the like; acrylic resins, such as polymethylmethacrylate, polyethylmethacrylate and styrene-methylmethacrylate or ethylene-methyl acrylate copolymers, ethylene-ethyl acrylate copolymers, ethylene-ethyl methacrylate copolymers, polystyrene and copolymers of styrene with unsaturated monomers mentioned below, polyvinyltoluene, cellulose derivatives, such as cellulose acetate, cellulose acetate butyrate, cellulose propionate, cellulose acetate propionate, and ethyl cellulose; polyvinyl resins such as polyvinyl chloride, copolymers of vinyl chloride and vinyl acetate and polyvinyl butyral, polyvinyl alcohol, polyvinyl acetal, ethylene-vinyl acetate copolymers, ethylene-vinyl alcohol copolymers, and ethylene-allyl copolymers such as ethylene-allyl alcohol copolymers, ethylene-allyl acetone copolymers, ethylene-allyl benzene copolymers ethylene-allyl ether copolymers, ethylene-acrylic copolymers and polyoxy-methylene, polycondensation polymers, such as, polyesters, including polyethylene terephthalate, polybutylene terephthalate, polyurethanes and polycarbonates. Styrenic or acrylic polymers and polyesters are preferred. Polystyrene and polymethylmethacrylate are especially preferred.

The polymeric core can be selected in order to provide desirable properties. For instance, polymers are well known which are soft or hard, elastic or inelastic, etc. It can be particularly advantageous to crosslink the polymer in order to increase it's strength, make it resistant to fracture, or make it insoluble in organic solvents. In the case of working films made of aluminum or the like having low hardness, it is preferred to use an aqueous dispersion containing polymer cores with a relatively low hardness. On the other hand, in the case of working films of high hardness such as tungsten, it is necessary to use an aqueous dispersion containing polymer cores of relatively high hardness.

The inorganic particles are silica, ceria (cerium oxide), alumina (aluminum oxide), zirconia, titania, manganese oxide, copper oxide, iron oxide, nickel oxide, silicon carbide, silicon nitride, tin oxide, titanium carbide, tungsten oxide, yttria, and the like, and combinations thereof. Preferred is silica, ceria (cerium oxide), and alumina (aluminum oxide). Especially preferred is silica.

Any suitable method of preparing core-shell particles having a polymeric core adherently covered with a shell of inorganic particles may be used to prepare the particulate media for use in accordance with this invention. As indicated above, the core-shell particles are made by forming liquid droplets with inorganic particles on the surface thereof, followed by solidification of the liquid droplets to form solid particles in which the inorganic particles are embedded. A preferred embodiment involves limited coalescence a technique by which the particle size and distribution are controlled using the inorganic particles as a solid stabilizer. For example, liquid droplets can comprise monomer and solidification can be by polymerization. Alternatively, the liquid droplets can comprise a polymer in a solvent and solidification can be by removing the solvent by evaporation, extraction, boiling etc. Preferably, the liquid droplets are formed employing the inorganic particles as the solid stabilizer in a limited coalescence technique. However, the particles can be formed by techniques other than limited coalescence, for example, the particles can be formed by jetting monomer through a membrane into a colloidal inorganic slurry.

The preferred method of preparing the particulate media, involving limited coalescence, includes the "suspension polymerization" technique and the "polymer suspension"

technique. In the "suspension polymerization" technique, a polymerizable monomer or monomers are added to an aqueous medium containing a particulate suspension of inorganic particles to form a discontinuous (oil droplets) phase in a continuous (water) phase. The mixture is subjected to shearing forces by agitation, homogenization and the like to reduce the size of the droplets. After shearing is stopped an equilibrium is reached with respect to the size of the droplets as a result of the stabilizing action of the inorganic particulate stabilizer in coating the surface of the droplets and then polymerization is completed to form an aqueous suspension of polymeric particles in an aqueous phase having a uniform layer thereon of inorganic particles. This process is described in U.S. Pat. Nos. 2,932,629; 4,148,741; 5,288,598; 5,378,577; 5,563,226 and 5,750,378 incorporated herein by reference.

In the "polymer suspension" technique, a suitable polymer is dissolved in a solvent and this solution is dispersed as fine water-immiscible liquid droplets in an aqueous solution that contains inorganic particles as a stabilizer. Equilibrium is reached and the size of the droplets is stabilized by the action of the inorganic particles coating the surface of the droplets. The solvent is removed from the droplets by evaporation or other suitable technique resulting in polymeric particles having a uniform coating thereon of inorganic particles. This process is further described in U.S. Pat. No. 4,833,060, hereby incorporated by reference.

In practicing this invention, using the suspension polymerization technique, any suitable monomer or monomers may be employed such as, for example, styrene, vinyl toluene, p-chlorostyrene; vinyl naphthalene; ethylenically unsaturated mono olefins such as ethylene, propylene, butylene and isobutylene; vinyl halides such as vinyl chloride, vinyl bromide, vinyl fluoride, vinyl acetate, vinyl propionate, vinyl benzoate and vinyl butyrate; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alphachloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidone, divinyl benzene, ethylene glycol dimethacrylate, mixtures thereof; and the like. Preferred are styrene, butyl acrylate or methyl methacrylate.

If desired, a suitable crosslinking monomer may be used in forming polymer particles by polymerizing a monomer or monomers, including a monomer or monomers that are polyfunctional with respect to the polymerization reaction, within droplets in accordance with this invention to thereby modify the polymeric particle and produce particularly desired properties. Typical crosslinking monomers are aromatic divinyl compounds such as divinylbenzene, divinylnaphthalene or derivatives thereof; diethylene carboxylate esters and amides such as 1,4 butanediol diacrylate, 1,4 butanediol dimethacrylate, 1,3 butylene glycol diacrylate, 1,3 butylene glycol dimethacrylate, cyclohexane dimethanol diacrylate, cyclohexane dimethanol dimethacrylate, diethylene glycol diacrylate, diethylene glycol dimethacrylate, dipropylene glycol diacrylate, dipropylene glycol dimethacrylate, ethylene glycol diacrylate, ethylene glycol dimethacrylate, 1,6 hexanediol diacrylate, 1,6 hexanediol dimethacrylate. neopentyl glycol diacrylate, neopentyl glycol dimethacrylate, tetraethylene glycol diacrylate, tetraethylene glycol dimethacrylate, triethylene glycol diacrylate, triethylene glycol dimethacrylate, tripropylene glycol diacrylate, tripropylene glycol diacrylate, pentaerythritol triacrylate, trimethylolpropane triacrylate, trimethylolpropane trimethacrylate, dipentaerythritol pentaacrylate, di-trimethylolpropane tetraacrylate, pentaerythritol tetraacrylate, and other divinyl compounds such as divinyl sulfide or divinyl sulfone compounds and mixtures thereof. Preferred are trimethylolpropane triacrylate, ethylene glycol dimethacrylate and divinyl benzene.

In the suspension polymerization technique, other addenda are added to the monomer droplets and to the aqueous phase of the mass in order to bring about the desired result including initiators, promoters and the like which are more particularly disclosed in U.S. Pat. Nos. 2,932,629 and 4,148,741, both of which are incorporated herein in their entirety.

Useful solvents for the polymer suspension process are those that dissolve the polymer, which are immiscible with water and which are readily removed from the polymer droplets such as, for example, chloromethane, dichloromethane, ethyl acetate, propyl acetate, vinyl chloride, methyl ethyl ketone, trichloromethane, carbon tetrachloride, ethylene chloride, trichloroethane, toluene, xylene, cyclohexanone, 2-nitropropane and the like. Particularly useful solvents are dichloromethane, ethyl acetate and propyl acetate because they are good solvents for many polymers while at the same time, being immiscible with water. Further, their volatility is such that they can be readily removed from the discontinuous phase droplets by evaporation or boiling.

The quantities of the various ingredients and their relationship to each other in the polymer suspension process can vary over wide ranges. However, it has generally been found that the ratio of the polymer to the solvent should vary in an amount of from about 1 to about 80% by weight of the combined weight of the polymer and the solvent and that the combined weight of the polymer and the solvent should vary with respect to the quantity of water employed in an amount of from about 25 to about 50% by weight. The size and quantity of the inorganic particulate stabilizer depends upon the size of the particles of the inorganic particulate and also upon the size of the polymer droplet particles desired. Thus, as the size of the polymer/solvent droplets are made smaller by high shear agitation, the quantity of inorganic particulate stabilizer is varied to prevent uncontrolled coalescence of the droplets and to achieve uniform size and narrow size distribution of the polymer particles that result. The suspension polymerization technique and the polymer suspension technique herein described are the preferred methods of preparing the particulate media having a core-shell structure comprising a polymeric core with a shell of inorganic particles for use in accordance with this invention. The coefficient of variation (ratio of the standard deviation) to the average diameter, as described in U.S. Pat. No. 2,932,629, referenced previously herein, is normally in the range of about 15 to 35%.

Preferably, the median diameter of the particle core is 0.05 to 20 micrometers, more preferably 0.2 to 2 micrometers. Median diameter is defined as the statistical average of the measured particle size distribution on a volume basis. For further details concerning median diameter measurement, see T. Allen, "Particle Size Measurement", 4th Ed., Chapman and Hall, (1990). It will be appreciated that while particle size is not per se critical, if the particles are too small, then the polishing rate of the slurry can be unacceptably low. It will also be appreciated that if, on the other hand, the particles are too large, then unacceptable scratching can occur on the surface of the article being polished.

The core particles are substantially spherical or spheroidal with smooth edges.

The inorganic particles are preferably 5 nm to 100 nm, preferably 10 to 25 nm. Preferably, the area coverage of the core with the inorganic particles is at least 20 percent, more preferably at least 50 percent, most preferable 80 to 100% as determined by SEM.

The core-shell abrasive particles can be present in the slurry in an amount of from about 0.1% to about 60% by weight of the slurry, with the optimal range being from about 1% to about 20% by weight of the slurry.

The process of this invention is particularly useful for applications where the surface being polished is susceptible to damage such as those listed below: In one embodiment, a method according to the present invention is used in the microelectronics industry to remove excess metal and/or dielectrics from integrated circuits, for example, on a wafer. In particular, removal of selected layers from an integrated circuit is facilitated using the core-shell particles as described above. The use of such particles helps to simplify and improve the removal process without damaging the delicate printed circuit lines or the underlying substrate material. The use of such particles also enables a process yielding an environmentally safe waste, one without caustic liquids intermingled with spent resist as described, for example, in U.S. Pat. No. 5,145,717.

The above-described process for the removal of material from surfaces has proven to be superior to prior art surface polishing techniques. One advantage of surface polishing by the present invention includes the ability to selectively remove outer layers of material while having underlying layers intact. This can be done by carefully applying the media to an area only until the desired layers are removed, leaving remaining layers intact. While such selective removal cannot be performed in some circumstances, such as where an underlying layer is too soft to remain intact, it is virtually impossible to perform selective removal with chemicals. It is also possible to modify the core-shell particle in order to achieve specific results. Such modifications include, for example, variations in the particle size, hardness, elasticity etc of the core and variations in the particle size, hardness and material of the inorganic shell.

The composite surface polishing system can be modified to meet the needs of particular situations. For example, the media particle size can all be modified in order to facilitate efficient polishing without damage to the surface being polished. Other modifications within the scope of this invention include the use of various additives.

The aqueous slurry according to the present invention may be prepared by dispersing the abrasive particles in an aqueous medium. The slurry may also be prepared as a two-component system (i.e., an abrasive dispersed in deionized water component and an organic compound in deionized water component). The slurry may also be prepared in concentrated form needing only the addition of deionized water to dilute the concentrate (or concentrated components in a two-component system) to the desired level.

Alternatively, the aqueous slurry according to the present invention may be formed by incorporating a portion of the components of the slurry in a polishing pad. For example, the abrasive particles and the organic compound could be incorporated directly in the polishing pad, and deionized water could then be added to the pad or the surface of the article being polished to form the polishing slurry in situ. In another alternative embodiment, the abrasive particles could be bonded to the polishing pad, and the organic compound and deionized water could be added either separately or together to the pad or the surface of the article being polished to form the polishing slurry in situ. It will be appreciated that the components of the aqueous slurry according to the invention could be combined in various ways to form the slurry in situ.

The aqueous dispersion containing the composite particles and water can contain other desired components such as acids, oxidizing agents and the like if necessary, and can be used as a polishing material for various devices including microelectronic devices, magnetic disks, and the like.

The medium of the aqueous dispersion may be water alone, or it may be a mixed medium containing an organic solvent such as an alcohol in combination therewith, so long as the polymer particles do not dissolve.

According to the present invention, the aqueous dispersion or CMP slurry may also contain, if necessary, various other additives in addition to the surfactant (for example, oxidizing agents, chelating agents, organic acids, surfactants, pH regulators, and the like.). Such addition can increase the polishing rate, stabilize the oxidizing agent, allow more even dispersion of the polymer particles, and adjust for differences in the polishing rate when polishing films of different hardness, as in cases where two or more working films are polished.

Inclusion of potassium hydroxide or ammonia allows polishing of insulating films, and inclusion of tungsten, aluminum, copper and the like allows polishing of metal films. The composition (particularly a CMP slurry) can also be used in combination with another composition (especially a CMP slurry) in an appropriate weight ratio.

The "oxidizing agent" used is not particularly restricted so long as it is water-soluble, and it is preferably selected as appropriate depending on the electrochemical properties of the metal layer of the working film of the wafer, based on a Pourbaix diagram, for example.

As specific oxidizing agents there may be mentioned organic peroxides such as hydrogen peroxide, peracetic acid, perbenzoic acid, tertbutylhydroperoxide, and the like; permanganate compounds such as potassium permanganate, and the like; bichromate compounds such as potassium bichromate, and the like; halogenate compounds such as potassium iodate, and the like; perhalogenate compounds such as perchloric acid, and the like; transition metal salts such as potassium ferricyanide, and the like; persulfuric compounds such as ammonium persulfate, and the like; polyvalent metal salts such as iron nitrate, cerium ammonium nitrate, and the like; and heteropoly acids such as silicotungstic acid, phosphotungstic acid, silicomolybdic acid, phosphomolybdic acid, and the like. Two or more of these may also be used in combination. By including such oxidizing agents it is possible to vastly increase the polishing rate for polishing of metal layers, and particularly of working films of wafers.

The oxidizing agent content may be 0.1–15 parts, and is particularly preferred to be 0.3–10 parts and especially 0.5–8 parts, with respect to 100 parts of the aqueous dispersion composition. If the content is less than 0.1 part the polishing rate of the aqueous dispersion composition will not be sufficiently increased. On the other hand, a sufficient improvement in the polishing rate can be achieved with a content of 15 parts, so that there is no need to include it at greater than 15 parts.

Examples of the "chelating agent" may be used with no particular restrictions so long as they can form metal chelate compounds, when the wafer working surface film is a metal. When the metal is copper, a compound containing nitrogen is particularly preferred.

As examples there may be mentioned triazole, indole, benzimidazole, benzoxazole-benzotriazole, quinoline, quinolinic acid, quinoxaline, benzoquinoline, benzoxidine, ammonia, ethylenediamine, triethanolamine, glycine, alanine, leucine, glutamine, glutamic acid, tryptophan, 5-amino-1H-tetrazole, 7-hydroxy-5-methyl-1,3, 4triazaindolazine, benzoguanamine, salicylaldoxime, adenine, guanine, phthalazine, 5-methyl-1H-benzotriazole, 4-amino-1,2,4-triazole, and the like.

The polishing composition preferably also has about 50 to 5,000 ppm (parts per million) of an inhibitor, for example, BTA (benzotriazole), or TTA (tolyltriazole) or mixtures thereof. Other inhibitors include, and are not limited to: 1-hydroxybenzotriazole, N-(1H-benzotriazole-1-ylmethyl) formamide, 3,5-dimethylpyrazole, indazole, 4-bromopyrazole, 3-amino-5phenylpyrazole, 3-amino-4-pyrazolecarbonitrile, 1-methylimidazole, Indolin QTS and the like. The inhibiting agent can absorb strongly on Cu/CuO surfaces to prevent etching/corrosion by chemical agents.

By adding appropriate amounts of these chelating agents it is possible to increase the polishing rate for polishing of the metal layers of wafers in particular, and thus improve the planarizing characteristics thereof. These chelating agents can also be used in combinations of two or more. The amount of the chelating agent added may be 0.01–5 parts, preferably 0.02–2 parts and especially 0.04–1 part, with respect to 100 parts of the aqueous dispersion composition.

The "organic acid" can further improve the polishing rate. As organic acids there may be mentioned para-toluenesulfonic acid, dodecylbenzenesulfonic acid, isoprenesulfonic acid, gluconic acid, lactic acid, citric acid, tartaric acid, malic acid, glycolic acid, malonic acid, formic acid, oxalic acid, succinic acid, fumaric acid, malefic acid and phthalic acid. Among these, gluconic acid, lactic acid, citric acid, tartaric acid, malic acid, glycolic acid, malonic acid, formic acid, oxalic acid, succinic acid, fumaric acid, malefic acid and phthalic acid are preferred. These organic acids may be used alone or in combinations of two or more. As inorganic acids there may be mentioned nitric acid, hydrochloric acid and sulfuric acid, and these inorganic acids may also be used alone or in combinations of two or more.

Combinations of organic acids and inorganic acids may also be used. These acids can be used at 0.1–10 parts by weight and especially 1–8 parts by weight to 100 parts by weight of the aqueous dispersion composition. An acid content in the range of 0.1–10 parts by weight is preferred to give an aqueous dispersion composition with excellent dispersability and sufficient stability, as well as minimal etching and an increased polishing rate.

According to the present invention, a surfactant may be added for more even dispersion of the particles, particularly the polymer particles, in the aqueous dispersion composition. The surfactant is preferably only present in a small amount from the standpoint of polishing performance. The surfactant content is preferably not greater than 0.15 wt%, more preferably not greater than 0.1 wt %.

According to the present invention, addition of an alkali metal hydroxide, ammonia, an inorganic alkali salt, an inorganic acid or an organic acid for adjustment of the pH can improve the dispersability and stability of the aqueous dispersion composition. As alkali metal hydroxides there may be used sodium hydroxide, potassium hydroxide, rubidium hydroxide, cesium hydroxide and the like. As inorganic acids there may be used nitric acid, sulfuric acid phosphoric acid or the like, and as organic acids there may be used formic acid, acetic acid, oxalic acid, malonic acid, succinic acid, benzoic acid or the like.

Adjustment of the pH of the aqueous dispersion composition can improve the dispersability while also increasing the polishing rate, and the pH is preferably determined as appropriate in consideration of the electrochemical properties of the working surface, the dispersability and stability of the polymer particles and the polishing rate. An embodiment of the polishing composition is an aqueous composition that has a pH under 5.0.

In the case of the removal of a dielectrics or oxides, the CMP slurry or composition comprising abrasive particles is suitably dispersed in an aqueous alkaline medium (i.e., high pH). Any alkaline agent such as KOH, $NH_4OH$ (ammonium hydroxide), NaOH, and the like can be used as a softening agent for the oxide to be removed.

The polishing composition may further contain pH buffers, such as amines, and may contain surfactants, deflocculants, viscosity modifiers, wetting agents, cleaning agents and the like.

The process of using the composition typically involves the use of a pad, preferably a metal pad, for example as described in U.S. Pat. No. 6,022,268, hereby incorporated by reference in its entirety. The method can be used to polish wafers and other microelectronic components or intermediates thereof. In a preferred embodiment of polishing surfaces, a conventional polishing machine employs a down force of 35 to 700, preferably 70 to 500 $g/cm^2$ (0.5 to 10 psi, preferably 1 to 6 psi), a platen speed of 25 to 400 rpm, preferably 50 to 200 rpm, a carrier speed of 25 to 400 rpm, preferably 50 to 200 rpm, and a media flow of 20 to 500, preferably 100 to 200 ml/min.

The following polishing pads can be used with the polishing composition to polish copper; a metals pad described in U.S. Pat. No. 6,022,268, a polishing pad containing particles for polishing described in U.S. Pat. No. 5,489,233, a polishing pad of polymer impregnated fiber matrices sold by Rodel Inc., Newark, Del., USA, under the trade name SUBA, a pad of a polymer sheet containing void spaces formed by in situ production or incorporation of hollow fill materials (sold by Rodel Inc. under the trademarks POLITEX and IC 1010), a pad of polymer sheets containing solid particles that are added as fillers that may optionally contain void spaces, effected either by in situ production or by incorporation of hollow filler materials (sold by Rodel Inc. under the trade name MH), and a composite pad of multiple layers of materials whose outer substrate that contacts the surface of the semiconductor being polished is one of the pads selected from the above.

The working film subjected to chemical mechanical polishing according to the present invention may be a silicon oxide film, amorphous silicon film, polycrystalline silicon film, single-crystal silicon film, silicon nitride film, pure tungsten film, pure aluminum film or pure copper film, or an alloy film of tungsten, aluminum or copper with another metal, formed on a wafer during manufacture of a semiconductor device such as a VLSI or the like. The working film may also be an oxide or nitride film of a metal such as tantalum or titanium.

When the polishing surface of the working film on the wafer is a metal, the polishing rate can be vastly improved by adding an oxidizing agent to the aqueous dispersion composition. The oxidizing agent used may be appropriately selected by a Pourbaix diagram, for example, based on the electrochemical properties of the working surface.

The chemical mechanical polishing of the working film on the wafer using the aqueous dispersion composition of the present invention can be accomplished with a commercially available chemical mechanical polishing device (such as Model "LGP510" or "LGP552" by Lapmaster SFT Corp.), which has been used in conventional methods employing metal oxide particles as abrasive particles.

EXAMPLE 1

This example illustrates the synthesis of various core-shell particles for use in a method according to the present invention.

Particle 1 (Invention)—Use of 0.02 $\mu$m Colloidal Silica as Shell

To a beaker were added the following ingredients: 225 g methyl methacrylate, 825 g butyl acrylate, 450 g trimethylol propane triacrylate, and 14.3 g 2,2'-azobis(2,4-dimethylvaleronitrile) (Vazo 52® from DuPont Corp.). The ingredients were stirred until all the solids were dissolved.

In a separate beaker, an aqueous phase was made by combining 2850 g distilled water, 60 g of phthalic acid monopotassium salt, 1.5 g of 10% HCl solution, and 49.35 g of a low molecular weight copolymer of methylaminoethanol and adipic acid. Next, 550 g Ludox TM® (50% by weight dispersion of 0.02 $\mu$m colloidal silica in water from DuPont Corp.) was added with stirring.

The aqueous and monomer phases were combined and then stirred with a marine prop-type agitator for 5 minutes to form a crude emulsion. The crude emulsion was passed through a Crepaco® homogenizer at 350 kg/cm$^2$. The resulting monomer droplet dispersion was placed into a three-necked round bottom flask and diluted with 1,580 g of distilled water. The flask was placed in a 55° C. constant temperature bath and the dispersion stirred at 65 revolutions/min under positive pressure nitrogen for 16 hours to polymerize the monomer droplets into polymeric particles, followed by two hours at 80° C. to reduce residual monomer content. After cooling to room temperature, the product was collected on a filter and washed with 5 l distilled water followed by 2 l methanol. The filter cake was dried under vacuum at 50° C. for two days and the dried product was then air classified to remove oversized grit.

The median size of the core-shell particles was measured by a particle size analyzer, Horiba LA-920®, and found to be 0.9 $\mu$m.

Particle 2 (Invention)—Use of 0.02 $\mu$m Colloidal Silica as Shell

The same procedure as used in synthesizing Particle 1 was followed except 16.15 g of a low molecular weight copolymer of methylaminoethanol and adipic acid and 180 g of Ludox TM® were used.

The median size of the core-shell particles was measured by a particle size analyzer, Horiba LA-920®, and found to be 2.7 $\mu$m.

Particle 3 (Invention)—Use of 0.02 $\mu$m Colloidal Silica as Shell

The same procedure as used in synthesizing Particle 1 was followed except 8.07 g of a low molecular weight copolymer of methylaminoethanol and adipic acid and 90 g of Ludox TM® were used.

The median size of the core-shell particles was measured by a particle size analyzer, Horiba LA-920®, and found to be 5.9 $\mu$m.

Particle 4 (Invention)—Use of 0.02 $\mu$m Colloidal Silica as Shell

A process as essentially described in Example 1 of U.S. Pat. No. 6,380,297 was used to make spherical particles with a polyester core.

The median size of the core-shell particles was measured by a particle size analyzer, Horiba LA-920@, and found to be 1.4 $\mu$m.

EXAMPLE 2

This example illustrates the preparation of various dispersions, using the core-shell particles of Example 1, for use in a method according to the present invention. The following aqueous polishing dispersions are all provided in wt % unless otherwise indicated.

Dispersion 1 (Invention)
Particle 1 was mixed with ion-exchanged water to a concentration of 3% and hydrogen peroxide was added to a concentration of 5%.

Dispersion 2 (Invention)
The same procedure as in Dispersion 1 was followed except Particle 1 was mixed to a concentration of 6%.

Dispersion 3 (Invention)
The same procedure as in Dispersion 1 was followed except glycine was also added to a concentration of 1%.

Dispersion 4 (Invention)
The same procedure as in Dispersion 2 was followed except glycine was also added to a concentration of 1%.

Dispersion 5 (Invention)
The same procedure as in Dispersion 1 was followed except Particle 2 was used instead of Particle 1.

Dispersion 6 (Invention)
The same procedure as in Dispersion 5 was followed except Particle 2 was mixed to a concentration of 6%.

Dispersion 7 (Invention)
The same procedure as in Dispersion 5 was followed except glycine was also added to a concentration of 1%.

Dispersion 8 (Invention)
The same procedure as in Dispersion 6 was followed except glycine was also added to a concentration of 1%.

Dispersion 9 (Invention)
The same procedure as in Dispersion 1 was followed except Particle 3 was used instead of Particle 1.

Dispersion 10 (Invention)
The same procedure as in Dispersion 9 was followed except Particle 3 was mixed to a concentration of 6%.

Dispersion 11 (Invention)
The same procedure as in Dispersion 9 was followed except glycine was also added to a concentration of 1%.

Dispersion 12 (Invention)
The same procedure as in Dispersion 10 was followed except glycine was also added to a concentration of 1%.

Dispersion 13 (Invention)
The same procedure as in Dispersion 1 was followed except Particle 4 was used instead of Particle 1.

Dispersion 14 (Invention)
The same procedure as in Dispersion 13 was followed except Particle 4 was mixed to a concentration of 6%.

Dispersion 15 (Invention)
The same procedure as in Dispersion 13 was followed except glycine was also added to a concentration of 1%.

Dispersion 16 (Invention)
The same procedure as in Dispersion 14 was followed except glycine was also added to a concentration of 1%.

Dispersion 17 (Comparison)
The same procedure as in Dispersion 1 was followed except Ludox TM® was used instead of Particle 1.

Dispersion 18 (Comparison)
The same procedure as in Dispersion 21 was followed except Ludox TM® was mixed to a concentration of 6% colloidal silica.
Dispersion 19 (Comparison)
The same procedure as in Dispersion 21 was followed except glycine was also added to a concentration of 1%.
Dispersion 20 (Comparison)
The same procedure as in Dispersion 22 was followed except glycine was also added to a concentration of 1%.

EXAMPLE 3

This example illustrates a method according to the present invention for polishing a surface using the various dispersions of core-shell particles made in Example 2.

The wafer tested was an electroplated 200 mm copper-patterned wafer of silicon dioxide (100 µm copper lines) having a Sematech® 931 mask. The Test Pad was polyurethane foam for polishing metal, in particular, pad IC-1400 manufactured by Rodel Inc. Newark, Del. (described in U.S. Pat. No. 6,022,268). A benchtop Buehler polishing machine was employed in the testing in which the wafer was held face down rubbing agains the pad while the pad and the wafer are both rotated in the same direction and the polishing slurry is dripped onto the pad. The wafer was polished with the control polishing composition using the following polishing parameters until the end point was detected by the polishing machine employing a down force of 420 g/cm$^2$ (6 psi), a platen speed of 93 rpm, a carrier speed of 87 rpm, and a slurry flow of 250 ml/min. The surface roughness results, measured by a non-contact optical profilometer made by Horizon Inc., of polishing copper film at 420 g/cm$^2$ (6 psi) employing the various dispersions are reported in Table 1 below.

TABLE 1

| Dispersion | Particle | Wt. % Particles | Glycine | Surface Roughness (nm) |
|---|---|---|---|---|
| 1 (Invention) | 1 | 3 | No | 1.5 |
| 2 (Invention) | 1 | 6 | No | 1.2 |
| 3 (Invention) | 1 | 3 | Yes | 0.9 |
| 4 (Invention) | 1 | 6 | Yes | 0.6 |
| 5 (Invention) | 2 | 3 | No | 2.5* |
| 6 (Invention) | 2 | 6 | No | 1.1 |
| 7 (Invention) | 2 | 3 | Yes | 1.0 |
| 8 (Invention) | 2 | 6 | Yes | 1.0 |
| 9 (Invention) | 3 | 3 | No | 1.3 |
| 10 (Invention) | 3 | 6 | No | 2.8* |
| 11 (Invention) | 3 | 3 | Yes | 1.1 |
| 12 (Invention) | 3 | 6 | Yes | 1.1 |
| 13 (Invention) | 4 | 3 | No | 1.4 |
| 14 (Invention) | 4 | 6 | No | 1.4 |
| 15 (Invention) | 4 | 3 | Yes | 1.0 |
| 16 (Invention) | 4 | 6 | Yes | 0.9 |
| 17 (Comparison) | Silica | 3 | No | 2.1 |
| 18 (Comparison) | Silica | 6 | No | 1.7 |
| 19 (Comparison) | Silica | 3 | Yes | 1.7 |
| 20 (Comparison) | Silica | 6 | Yes | 1.9 |

*apparently aberrant result based on single point data

Absolute polishing rates were on the order of 600 nm/mm for controls and for inventive particles 200 to 300 nm/min. A normalized removal rate, based on grams of silica employed, however, would be significantly improved for the dispersions of the present invention. The above data in Table 1 show that when a colloidal inorganic is adhered to the surface of a monomer droplet followed by polymerization and the resultant polymer particles is used for CMP the surface roughness (i.e. smoothness results) are superior to when the colloidal inorganic is used for CMP.

The invention has been described in detail with particular reference to certain preferred embodiments thereof, but it will be understood that variations and modifications can be effected within the spirit and scope of the invention.

What is claimed is:

1. A process of polishing for removing material from a surface, the method comprising applying a particulate media against said surface by means of rubbing, characterized by the particulate media comprising particles having a core-shell structure in which a polymeric core is adherently covered with a shell of inorganic particles, wherein the core-shell particles were made by forming liquid droplets with inorganic particles on the surface thereof, followed by solidification of the liquid droplets to form solid particles in which the inorganic particles are embedded to hold the inorganic particles in place, wherein said polymeric core has a median diameter of 0.05 to 20 micrometers, said inorganic particles have a median diameter of 5 nm to 100 nm, and wherein the area coverage of the inorganic particles on the polymeric core is at least 50 percent.

2. The process of claim 1 wherein said rubbing is accomplished by means of a rotating pad.

3. The process according to claim 1 in which the liquid droplets comprise monomer and solidification comprises polymerization.

4. The process according to claim 1 in which the liquid droplets comprise a polymer in a solvent and solidification comprises removing the solvent.

5. The process according to claim 1 wherein the particles are formed by jetting monomer through a membrane into a colloidal inorganic slurry.

6. The process according to claim 1 wherein the material to be removed is a metal or dielectric.

7. The process of claim 6, wherein the metal is selected from the group consisting of copper, tantalum, and combinations thereof and the dielectric is selected from the group consisting of silicon oxide, silicon nitride and combinations thereof.

8. The process according to claim 1 wherein the method comprises applying the particulate media in the form of a composition further comprising one or more components selected from the group consisting of an oxidizer, chelating agent, surfactant, stabilizer for colloidal stability, pH control agent, inhibiting agent to prevent chemicals from etching the surface, and combinations thereof.

9. The process according to claim 8 wherein the composition is a slurry comprising 1 to 20% by weight of the core-shell particles in an aqueous carrier.

10. The process of claim 8 wherein the oxidizer is a peroxide or citric acid.

11. The process of claim 8 wherein the chelating agent is glycine.

12. The process according to claim 1 wherein the core is a polyester, styrenic or acrylic polymer.

13. The process according to claim 1 wherein the core is crosslinked.

14. The process according to claim 1 wherein the inorganic particles are colloidal silica, ceria (cerium oxide), alumina (aluminum oxide), or combinations thereof.

15. The process of claim 1 comprising removing metal or dielectric material from integrated circuits.

16. The process of claim 1 wherein the core particles are substantially spherical or spheroidal with a substantially smooth surface except where embedded with inorganic particles.

17. The process of claim 1 wherein the rubbing is accomplished by means of a polyurethane pad.

18. The method of claim 1 wherein the surface is on a wafer and polishing is by means of a polishing machine employing a down force of 35 to 700 g/cm$^2$, a platen speed of 25 to 400 rpm, a carrier speed of 25 to 400 rpm, and a media flow of 20 to 500 ml/min.

19. A polishing composition comprising an aqueous dispersion of 1 to 30 percentage by weight of particles having a core-shell structure in which a polymeric core is adherently covered with a shell of inorganic particles, wherein the particles were made by forming liquid droplets with inorganic particles on the surface thereof, followed by solidification of the liquid droplets to form solid particles in which the inorganic particles are embedded to hold the inorganic particles in place, wherein said polymeric core has a median diameter of 0.05 to 20 micrometers, said inoraanic particles have a median diameter of 5 nm to 100 nm, and wherein the area coverage of the inorganic particles on the polymeric core is at least 50 percent, said composition further comprising an effective amount of oxidizer and chelating agents for chemical-mechanical polishing an integrated circuit.

20. The composition of claim 19 further comprising one or more pH agents for pH control.

21. The composition of claim 19 further comprising an effective amount of a, surfactant, stabilizers for colloidal stability, pH control agents, and/or an inhibiting agent to prevent chemicals from etching the surface.

22. The polishing composition according to claim 19 wherein the core is a polyester, styrenic or acrylic polymer.

23. The polishing composition according to claim 19 wherein the core is crosslinked.

24. The polishing composition according to claim 19 wherein the inorganic particles are colloidal silica.

25. The polishing composition according to claim 19 wherein the composition comprises a peroxide.

26. The polishing composition according to claim 19 wherein the composition comprises glycine.

27. The polishing composition of claim 19, said composition further comprising an effective amount of a softening agent for an oxide dielectric in an integrated circuit.

28. The polishing composition of claim 27 herein the softening agent is selected from the group consisting of KOH, NH$_4$OH, NaOH, and combinations thereof.

29. A process of polishing for removing material from a surface, the method comprising (a) forming core-shell particles having a core-shell structure in which a polymeric core is adherently covered with a shell of inorganic particles by forming liquid droplets with inorganic particles on the surface thereof, followed by solidification of the liquid droplets to form solid particles in which the inorganic particles are embedded;

(b) applying a particulate media comprising said core-shell particles against said surface by means of rubbing.

30. The polishing composition according to claim 29 in which the liquid droplets comprise monomer and solidification comprises polymerization.

31. The polishing composition according to claim 29 in which the liquid droplets comprise a polymer in a solvent and solidification comprises removing the solvent.

32. The polishing composition according to claim 29 wherein the particles are formed by jetting monomer through a membrane into a colloidal inorganic slurry.

* * * * *